United States Patent

[11] 3,611,114

| [72] | Inventor | Jean Sole<br>Clamart, France |
|---|---|---|
| [21] | Appl. No. | 887,933 |
| [22] | Filed | Dec. 24, 1969 |
| [45] | Patented | Oct. 5, 1971 |
| [73] | Assignee | Commissariat A L'Energie Atomique<br>Paris, France |
| [32] | Priority | Dec. 27, 1968, Dec. 27, 1968 |
| [33] | | France |
| [31] | | PV 181,325 and PV 181,326 |

[54] SHUNT RECTIFIERS FOR INTRODUCING, TRAPPING AND MAINTAINING AN ELECTRIC CURRENT WITHIN A SUPERCONDUCTING CIRCUIT
11 Claims, 8 Drawing Figs.

[52] U.S. Cl. .................................................... 323/8,
321/8 CD, 323/44 F, 323/68, 323/81
[51] Int. Cl. ....................................................... G05f 3/02

[50] Field of Search........................................... 321/8, 8
CD; 323/6, 8, 44 F, 68, 69, 81, 100 FB; 307/306

[56] References Cited
UNITED STATES PATENTS
3,327,202  6/1967  Mills............................ 323/100 FB X
3,356,924  12/1967  Buchhold...................... 321/8 CD

*Primary Examiner*—Gerald Goldberg
*Attorney*—Craig, Antonelli and Hill

ABSTRACT: Arrangements for introducing, trapping and maintaining in a superconducting circuit an electric current supplied by a voltage generator which is connected directly to circuit terminals. Connected in parallel across the terminals of the superconducting circuit is a current rectifier which is connected so that its forward direction should correspond to a negative voltage which is established between the circuit terminals.

INVENTOR

JEAN SOLE

INVENTOR

JEAN SOLE

SHUNT RECTIFIERS FOR INTRODUCING, TRAPPING AND MAINTAINING AN ELECTRIC CURRENT WITHIN A SUPERCONDUCTING CIRCUIT

This invention relates to a method for introducing, storing and if necessary maintaining an electric current in a superconducting circuit and is also concerned with the devices for carrying out said method.

It is known that, in a very general manner, in order to trap a current in a circuit which usually comprises an inductance coil L or a winding formed of superconducting material, it is necessary first to establish the current $I_o$ to be trapped across said coil by any suitable means, then to connect the terminals A and B of said coil by means of a conducting connection and especially by closing a switch K which is mounted between said terminals as shown in FIG. 1 of the accompanying drawings. The inductance coil L and the switch K are preferably placed within a cryogenic chamber as represented by broken lines in the drawings, the function of said chamber being to bring the material which constitutes the coil to the superconducting state. When the switch K is closed, said switch can be a totally superconducting element, in which case the current $I_o$ is trapped in the circuit for an indefinite period when the generator G which produces the necessary voltage is disconnected. Alternatively, said switch can be constituted by a device having a sufficiently low electric resistance $r$ in the closed state to ensure that, once the generator is disconnected, the time constant $L/r$ of decay of the current within the coil L is sufficiently small compared with the period of storage of energy to ensure that said decay can be tolerated or considered negligible.

In a conventional manner, the introduction of current $I_o$ in the coil L is carried out as follows: in a first stage, the switch K being open, a potential difference V is established between the terminals A and B by means of the generator G; the current $I(t)$ within the inductance coil satisfies the equation:

(1) $V(t)=L(dI(t)/dt)$

It is accordingly deduced that, if $V(t)$ is positive, $dI(t)/dt$ is also positive, which means that $I(t)$ increases. On the other hand, if $V(t)$ is negative, then $dI(t)/dt$ is negative and $I(t)$ decreases.

As a result of integration, it is possible by means of relation (1) to calculate the current within the coil at the instant $t$.

(2) $I(t)=1/L\int_0^t V(t)\cdot dt$

When the current $I()$ attains the value $I_o$ which it is desired to trap in the inductance coil $L$ the switch K is closed and the generator G is disconnected. Two cases are then possible according as the electric resistance of the switch is either zero or has a low but finite value $r$.

In the first case which corresponds to the superconducting switch, relation (1) is written, since the voltage $V$ is zero:

(3) $L(dI(t)/dt)=0$ hence (4) $I=I_o$ = constant and the current $I_o$ thus remains trapped within the inductance coil $L$ for an indefinite period.

In the second case in which the resistance of the switch is not zero, the relation which expresses the current within the inductance coil is written:

(5) $LdI(t)/dt+rI(t)=0$ hence (6) $I=I_o\cdot e^1(r/L)t$

Under these conditions, it is apparent that $I_o$ decreases with the time constant $L/r$.

The application of this known method is simple only when the voltage delivered by the generator is continuous or at least of constant sign if it varies in amplitude. On the other hand, if the voltage supplied by the generator is variable and likely to change its sign, especially in the case of alternating current, or if said voltage can fall to zero for a relatively long time interval without changing sign, the operation of the switch becomes more complex.

It can in fact be deduced from the general remarks given in the foregoing that the switch which is placed between the terminals of the superconducting circuit must be opened or, in other words, must introduce between said terminals a very high electrical resistance when the voltage is positive. On the other hand, said switch must be closed, that is to say must short-circuit said terminals when the voltage is negative.

Moreover, when the voltage falls to zero for a predetermined time interval without becoming negative, the switch must be closed. Otherwise, the current in fact passes through the generator, the internal resistance of which is not zero and the trapped current decreases.

The present invention is directed to a method for introducing, trapping and maintaining a current within a superconducting circuit in which use is made of a generator for producing a voltage of variable sign and especially alternating-current voltage, or a generator whose voltage is capable of falling to zero during a predetermined time interval which is governed by the considerations set forth in the foregoing.

To this end, said method consists in mounting across the terminals of the circuit a current rectifier which is connected so that its forward direction should correspond to a negative voltage which is established between said terminals.

In the more simple embodiment of a device or circuit for carrying out the method according to the invention, the voltage generator is connected directly to the terminals of the superconducting circuit which is constituted in particular by a superconducting coil and between which is mounted at least one current rectifier. However, and in order to introduce in the circuit all the available energy which is supplied by the generator, irrespective of the sign of the voltage which is delivered, the superconducting circuit is advantageously coupled to the generator through a bridge rectifier circuit in order to convert a voltage having a variable direction and delivered by the generator to a voltage of constant sign at the terminals of the circuit.

In further alternative forms, the rectifiers can be constituted either by means of diodes or by means of three-electrode rectifiers such as transistors or thyristors which are mounted with two common electrodes.

A number of different examples of construction of circuits of this type will now be set forth in the following description which is given by way of example and not by way of limitation.

Figure 1:
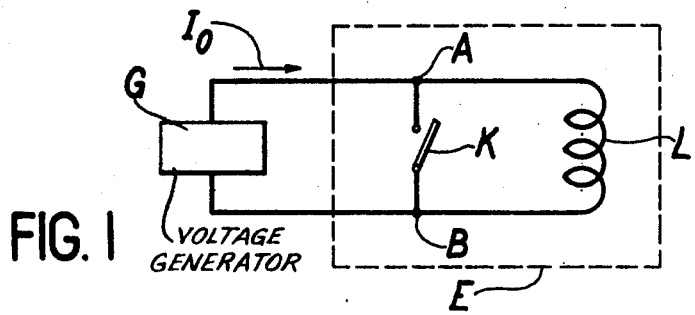
FIG. 1 is a schematic circuit diagram of a conventional superconducting circuit.
Figure 2:
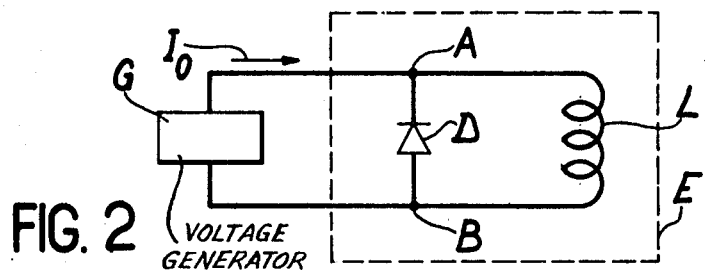
FIGS. 2 and 3 illustrate two alternative modes of assembly of rectifiers which are connected across the terminals of a superconducting circuit.

FIG. 2 shows the circuit arrangement which has already been considered with reference to FIG. 1 and comprises an inductance coil L formed of superconducting material, the terminals A and B of which are connected to a voltage generator G. The inductance coil L is placed within a cryogenic chamber E. In accordance with the invention, there is mounted between the terminals A and B a rectifier constituted by a diode D which allows current to pass in the circuit of the inductance coil L only in respect of a negative value of the voltage which is established between these terminals.

Under these conditions, if the generator G delivers a voltage (or a current) having a variable direction and is constituted, for example by an alternating-current network or by an antenna for receiving electromagnetic waves or alternatively by a transducer for converting mechanical energy into electrical energy, the rectifier D short-circuits the generator G when the voltage delivered at its terminals is in the forward direction and consequently performs a function which is similar to that of the switch K when this latter is closed. On the other hand, the reverse direction, said rectifier has a high resistance and produces a current increase within the inductance coil L according to relation (2).

Similarly, if the generator G delivers a voltage which has a constant direction but is capable of falling to zero for long periods of time (for example in the case of thermopiles or photoelectric cells such as thermocouples or solar cells such as those provided in satellites) the rectifier D short-circuits the generator G when the voltage delivered at its terminals falls to zero and thus closes the storage circuit.

Figure 3:
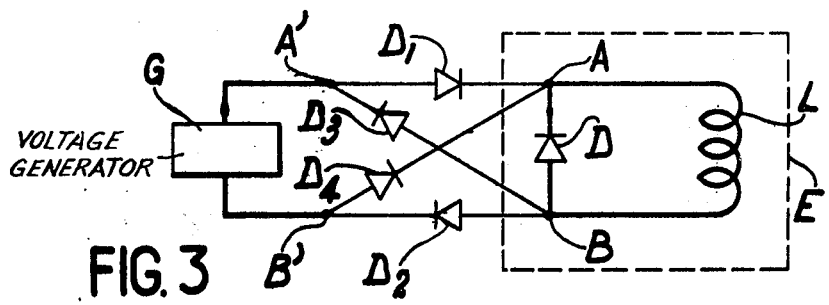

The circuit arrangement which is illustrated in FIG. 3 serves to introduce into the inductance coil L the energy which is available at the terminals of the generator G irrespective of the direction of the voltage delivered. To this end, the terminals A and B on the one hand and A' and B' on the other hand are connected by four diodes $D_1$, $D_2$, $D_3$ and $D_4$ which are bridge-connected as shown in the figure and serve to convert a voltage having a variable direction as established between A' and B' to a voltage having a constant direction and obtained between A and B by half-wave rectification. The remainder of the circuit which comprises the rectifier or diode D is similar to that which is illustrated in FIG. 2.

It should be noted that in the circuit arrangement described above, the diodes $D_1$, $D_2$, $D_3$ and $D_4$ can be totally separated from the superconducting circuit itself and in particular need not be placed within the cryogenic chamber E. In fact, the only purpose of these diodes is to rectify the voltage and not to trap the current within the circuit. However, it is an advantage to ensure that these diodes are provided with superconducting connections. By way of alternative, the rectifier D could simply be dispensed with. In this case, trapping of the current is effected by means of the diodes $D_1$ and $D_3$ which are connected in series and in parallel with $D_2$ and $D_4$ which are also connected in series to each other.

Figure 4:
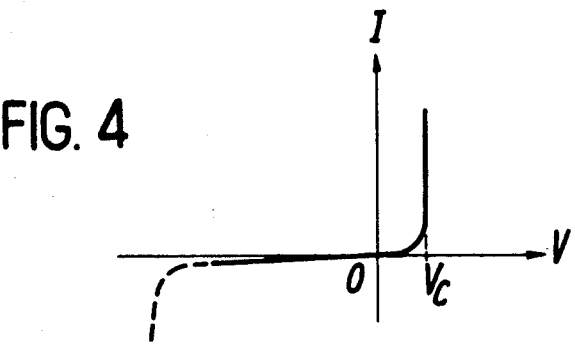
FIG. 4 represents the characteristics of a rectifier of a given type.

If $r$ designates the resistance in the forward direction of the rectifier D in either of the circuit arrangements of FIG. 2 or FIG. 3, the current which is trapped in the inductance coil $L$ decays in accordance with the law which is given by relation (6). The rectifier or diode D must therefore be chosen so that its electric resistance in the forward direction should be sufficiently low compared with the value of the inductance coil L By way of indication, in the case of a rectifier D constituted by a diode of type 303 Z4 or 319 Z4, the current-voltage curve is given in FIG. 4. In this figure, one can readily note the voltage $V$ above which the diode changes over from the reverse direction (on the left-hand side of the curve) to the forward direction (right-hand side of the curve), this voltage being slightly greater than 1 volt when the diode is heated to the temperature of 4.2° K. of liquid helium, for example. When a current passes through the diode in the forward direction, the terminal voltage of said diode which is equal to $V_c$ therefore remains practically constant irrespective of the value of this current. Under these conditions and in the case of the assembly according to FIG. 2 or FIG. 3, the current $I_o$ which is trapped in the inductance coil L will vary according to the relation:

(7) $L(dI(t)/dt) + a8V_c = 0$ with $V_c$ = constant. We accordingly deduce therefrom:

(8) $I = I_o - (V_c/L)t$

The current $I$ within the inductance coil therefore decreases linearly as a function of time and falls to zero at the instant $t$ such that:

(9) $t = (L/V_c)I_o$

Under these conditions, the rectifier D is chosen so as to ensure that the ratio $L/V_c$ is as high as possible in order that the current which is trapped within the coil falls to zero only after a time interval which is as long as possible.

Figure 5:
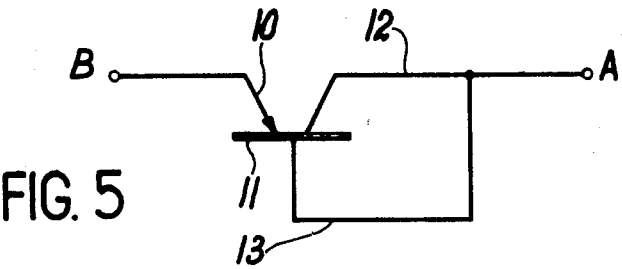
FIGS. 5 and 6 are diagrammatic views of two different circuits in which the rectifiers are constituted by three-electrode elements.

Generally speaking, the diodes D on the one hand and $D_1$ to $D_4$ on the other hand can be replaced by any other suitable rectifier system. In particular, transistors or thyristors may be employed. Thus, there is shown in FIG. 5 a transistor of this type comprising an emitter 10, a base 11 and a collector 12, the base and the collector being coupled by means of a connection 13; an arrangement of this type is then equivalent to the diode D which was considered earlier.

Figure 6:
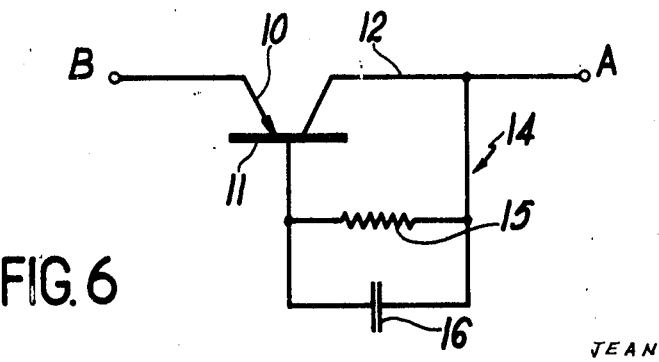

In FIG. 6, there is again shown the same rectifier in which the base and the collector are connected through a circuit 14 comprising an electric resistor 15 and capacitor 16 which are mounted in parallel. Said resistor 15 serves to polarize the base correctly while limiting the emitter-base current. The capacitor 16 is intended to transmit to the base the fast variations in potential between the terminals of the rectifier.

In the corresponding circuit arrangement which makes use of a thyristor, the anode and control electrode may be connected through a protective resistor.

Figure 7:
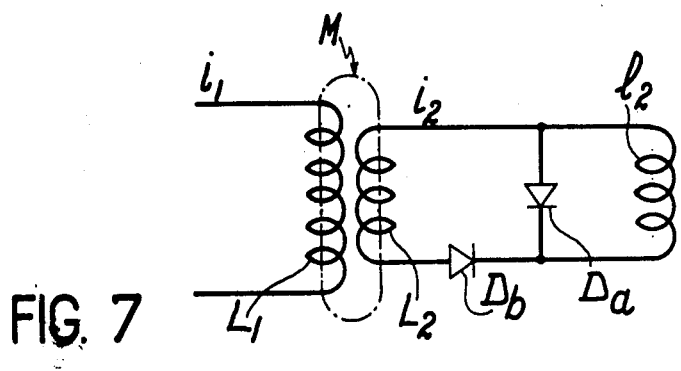
FIGS. 7 and 8 illustrate two further alternative forms of circuit arrangements.

In FIG. 7, the generator G is replaced by a superconducting transformer in which $L_1$ designates the self-induction of the superconducting primary winding, $L_2$ designates the self-induction of the secondary winding and M designates the mutual induction of the two windings, $l_2$ designates the self-induction of the superconducting coil or circuit in which a current is to be introduced, $i_1$ and $i_2$ designate the primary and secondary currents and Da and Db designate two diodes which effect automatic switching of the circuit for introducing and trapping the current which is supplied.

In the circuit described above, the current within the winding $l_2$ of the superconducting circuit is established in successive stages in accordance with the arrangements already described in French Pat. No. 1 522 300 of Feb. 23rd, 1967, the diodes Da and Db being intended to perform at the same time a double function of switches and of a device for effecting the automatic changeover of these latter.

Figure 8:
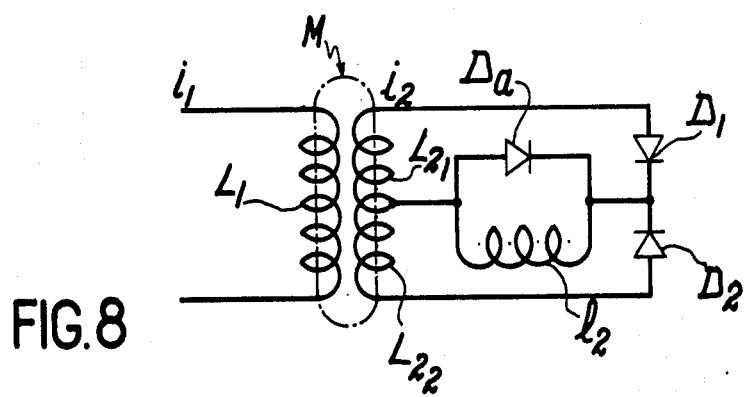

Similarly, in the alternative form of FIG. 8, the secondary winding of the transformer is divided into two symmetrical windings $L_{21}$ and $L_{22}$, the circuit $l_2$ to be put on load being connected to the midpoint of these windings while being also mounted in parallel with a first diode Da whilst two other diodes $D_1$ and $D_2$ perform alternately in the case of the two portions of the circuit the function of the diode Db of the circuit according to FIG. 7. The advantage of this arrangement lies in the fact that the two half-waves of the current $i_2$ which is supplied to the secondary of the transformer can be employed for the load of the superconducting circuit.

By means of the assembly of FIGS. 7 and 8, it is possible to provide a direct connection with the mains supply, for example. In fact, it may be noted insofar as the primary winding of the superconducting transformer is concerned that alternating current only passes through said transformer in an application of this type. The secondary winding of said transformer carries a current having a constant direction (action of the rectifier Db or of the rectifiers $D_1$ and $D_2$) but is of variable intensity. The energy storage inductance coil $l_2$ carries a current having a constant direction and alternately constant or slowly increasing intensity. This results primarily in the need to take special precautions in the fabrication of the primary winding of the transformer, this latter being supplied with alternating current at industrial frequency. Said primary winding can be formed:

either by means of conventional conductors having a high degree of purity (for example of copper or aluminum) which have a very low resistance to very low temperatures and which give rise to a small Joule effect;

or by means of very highly stabilized superconductors (especially by means of an excess of materials having very good electrical conductivity such as copper or aluminum or by means of materials which possess electrical resistance but are nevertheless endowed with good heat conductivity such as nickel-copper alloys and the like, thereby permitting better distribution of the magnetic field and reducing degradation phenomena in alternating-current operation);

or by means of an overdimensioned primary circuit.

The same design solutions can be employed for the secondary winding of the transformer and for the connections between said secondary winding, the rectifiers and the inductance coil $l_2$. In this case, these solutions are less essential since the current no longer changes direction in these portions of the circuit.

In the case of the inductance coil $l_2$ which only carries an alternately constant or slowly increasing current, these solutions become even less essential.

Finally, it should be noted that, as in the other alternative forms which were contemplated earlier, the diodes of the circuits of FIGS. 7 and 8 can be replaced by three-electrode rectifiers of the transistor or thyristor type.

Whatever circuit arrangement may be adopted, the energy which is stored in the inductance coil L can be discharged at any moment into an external load impedance by connecting this latter to the terminals of the circuit after disconnection of the generator G and opening the switch which is placed between said terminals. This opening can be obtained either by modifying the base voltage if the switch consists of a transistor or by placing in series with the rectifier D a conventional superconducting switch which is opened at the appropriate instant.

As will be readily understood, the invention is not limited in any sense to the exemplified embodiments which have been more especially described with reference to the accompanying drawings and extends, on the contrary, to all alternative forms.

I claim:

1. A circuit for introducing, trapping and maintaining an electric current comprising a superconductive circuit, a voltage generator connected to said superconductive circuit for introducing an electric current therein, and control means connected to said superconductive circuit for trapping and maintaining said electric current including a current rectifier connected directly in parallel to said superconductive circuit to be biased in the forward direction thereof by a voltage applied thereto having a polarity opposite to that which is applied at the time said electric current is introduced by said generator into said superconductive circuit.

2. A circuit according to claim 1, wherein said current rectifier is a diode.

3. A circuit according to claim 1, wherein said current rectifier is a transistor connected with common base and collector.

4. A circuit according to claim 1, wherein said current rectifier is a semiconductor thyristor connected with common anode and control electrode.

5. A circuit according to claim 1, wherein said control means further includes a bridge rectifier circuit coupling said superconducting circuit to said voltage generator, said bridge rectifier circuit serving to convert any voltage of variable polarity applied from said generator to a voltage of constant polarity.

6. A circuit according to claim 1, wherein said voltage generator delivers a voltage of variable sign.

7. A circuit according to claim 1, wherein the voltage generator delivers an alternating-current voltage.

8. A circuit according to claim 1, wherein the voltage generator delivers a voltage of constant polarity which is capable of falling to zero amplitude.

9. A circuit according to claim 1, wherein the voltage generator is constituted by a transformer having a superconducting primary winding and a secondary winding connected across said superconducting circuit, said current rectifier being connected in parallel with said secondary winding and said control means further including an additional rectifier connected in series with said secondary winding.

10. A circuit according to claim 1, wherein the voltage generator includes a transformer having a superconducting primary winding and a secondary winding have a center tap connected to one side of said superconducting circuit, said control means further including first and second additional rectifiers connecting respective ends of said secondary winding to the other side of said superconducting circuit.

11. A circuit according to claim 1, wherein said superconducting circuit is formed by a superconductive winding.